United States Patent [19]
Chadha et al.

[11] Patent Number: 5,845,274
[45] Date of Patent: Dec. 1, 1998

[54] COMPUTER PROGRAM PRODUCT FOR AVOIDING COMPLETE INDEX TREE TRAVERSALS IN SEQUENTIAL AND ALMOST SEQUENTIAL INDEX PROBES

[75] Inventors: Atul Chadha, Milpitas; Donald J. Haderle, Los Gatos; Akira Shibamiya, Los Altos; Robert W. Lyle; Steven J. Watts, both of San Jose, all of Calif.

[73] Assignee: International Business Machines Corporation, Armonk, N.Y.

[21] Appl. No.: 471,509

[22] Filed: Jun. 6, 1995

Related U.S. Application Data

[62] Division of Ser. No. 438,558, May 10, 1995.
[51] Int. Cl.$^6$ ................................................ G06F 17/30
[52] U.S. Cl. ............................... 707/2; 707/1; 707/204
[58] Field of Search .......................... 395/600, 601, 395/602, 620

[56] References Cited

U.S. PATENT DOCUMENTS

| | | | |
|---|---|---|---|
| 4,606,002 | 8/1986 | Waisman et al. | 364/200 |
| 4,620,295 | 10/1986 | Alken, Jr. | 364/900 |
| 4,774,657 | 9/1988 | Anderson et al. | 364/200 |
| 4,860,197 | 8/1989 | Langendorf et al. | 364/200 |
| 4,914,569 | 4/1990 | Levine et al. | 364/200 |
| 4,980,823 | 12/1990 | Liu | 364/200 |
| 5,123,104 | 6/1992 | Levine et al. | 395/600 |
| 5,287,499 | 2/1994 | Nemes | 395/600 |
| 5,305,389 | 4/1994 | Palmer | 382/1 |
| 5,355,473 | 10/1994 | Au | 395/600 |
| 5,379,422 | 1/1995 | Antoshenkov | 395/600 |
| 5,408,652 | 4/1995 | Hayashi et al. | 395/600 |
| 5,408,654 | 4/1995 | Barry | 395/600 |
| 5,430,870 | 7/1995 | Stanton et al. | 395/600 |
| 5,440,732 | 8/1995 | Lomet et al. | 395/600 |
| 5,485,609 | 1/1996 | Vitter et al. | 395/600 |
| 5,497,485 | 3/1996 | Ferguson et al. | 395/600 |

*Primary Examiner*—Thomas G. Black
*Assistant Examiner*—Jean M. Corrielus
*Attorney, Agent, or Firm*—Sterne, Kessler, Goldstein & Fox P.L.L.C.; Prentiss W. Johnson, Esq

[57] ABSTRACT

The present invention provides a system and method for utilizing the proximity of keys in sequential or near sequential index probes to avoid complete index tree traversal. Page information from three pages (LAST, PARENT and NEXT) are stored in separate information fields within an Index Lookaside Buffer. The LAST information field contains information on the most recent leaf page accessed during an index probe in a read key or an insert key operation, the PARENT information field contains information on the parent page of the most recently accessed leaf page described in the LAST information field, and the NEXT information field contains information on the most recent leaf page accessed during a fetch-next key or delete key operation. On a subsequent index probe, the LAST, NEXT and PARENT information fields are sequentially analyzed to determine if the search key is contained within the leaf page described by the LAST or NEXT information fields or if the search key is contained within one of the leaf pages pointed to by the parent page described by the PARENT information field. If none of the LAST, NEXT or PARENT information fields identify the leaf page containing the search key then the default root-to-leaf traversal would commence.

24 Claims, 8 Drawing Sheets

COMPUTER PROGRAM PRODUCT FOR AVOIDING COMPLETE INDEX TREE TRAVERSALS IN SEQUENTIAL AND ALMOST SEQUENTIAL INDEX PROBES

This application is a division of application Ser. No. 08/438,558, filed May 10, 1995, (status: pending).

DESCRIPTION

1. Technical Field

The present invention relates generally to database management systems and methods for locating an index key value within a multilevel index tree. More specifically, this invention provides a method for avoiding complete index tree traversals in sequential and near sequential probes in a multilevel index tree.

2. Background Art

Figure 1:
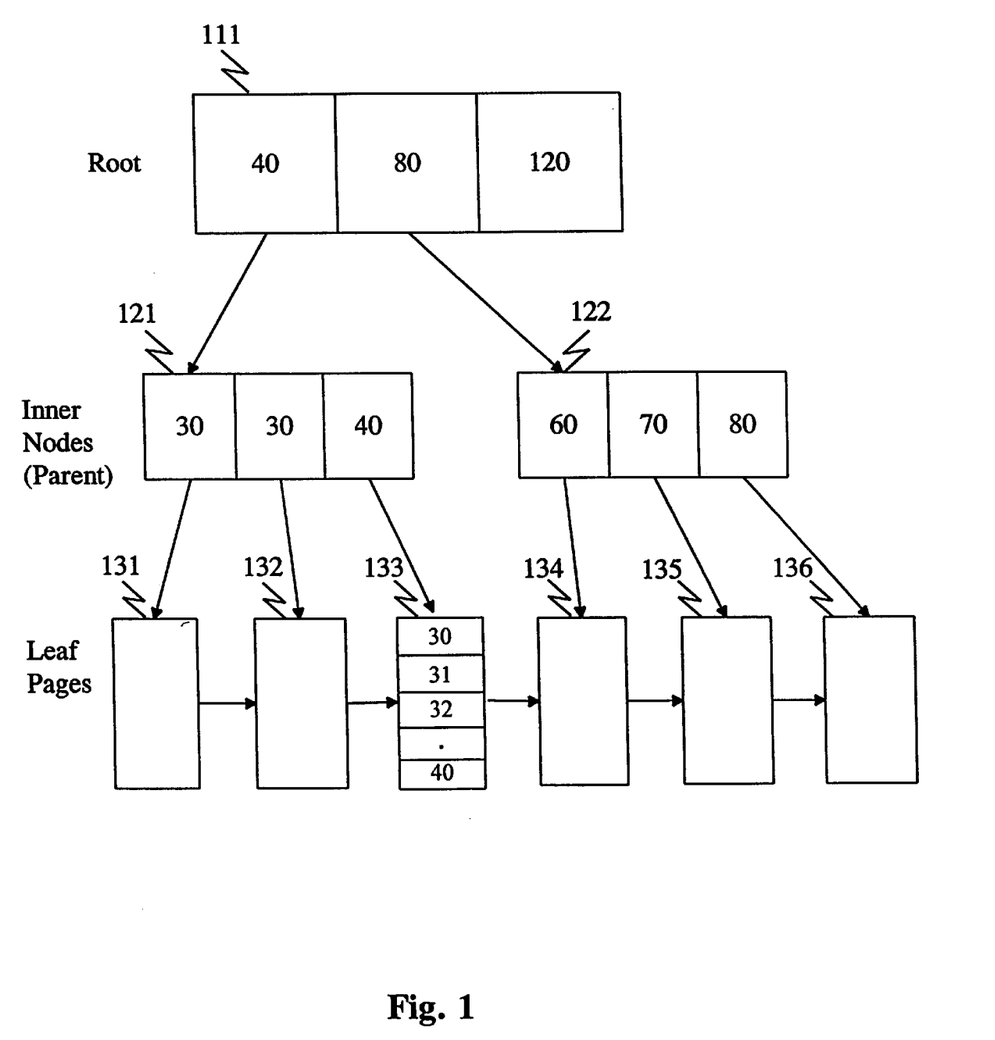
FIG. 1 is an illustration of a tree structured index.

Referring to FIG. 1, there is shown a B+ index tree (also referred to as a tree structured index) consisting of a root level 111, inner nodes 121 and 122, and leaf pages 131–136. Although only three levels are shown, it should be understood that an index tree may include additional levels depending on the size of a particular index. The numerical values within the inner nodes represent the largest existing key values for the lower nodes to which it points. For example, the numerical value "40" in root 111 is the high key (or highest) value of the inner node 121 containing numerical values "30", "30" and "40". Likewise, the numerical value "40" within inner node 121 is the high key value of leaf page 133.

To locate a particular key contained within the index tree, the value of that key, hereinafter referred to as the search key, is used to guide the search (or traversal) through the index tree. This index probe begins by comparing the search key value to the high key values within the root node 111. For example, if the search key value is less than or equal to "40" then the probe would traverse the path from root node 111 to inner node (parent) 121 to leaf page 133 as outlined above. Once the leaf page level is reached, a search is performed on that leaf page to find the key.

In a conventional database system, each successive index probe initiated in response to an insert, delete, update or fetch command from a database application would require the root-to-leaf index tree traversal described above. Each of these root-to-leaf traversals, however, comes at substantial CPU cost. The CPU must search each traversed node for the first key value greater than or equal to the search key, in order to eventually reach the correct leaf node. This necessarily requires fixing a node into a buffer pool when being searched and unfixing the node from the buffer pool after being searched. Thus, what is needed is a method of eliminating root-to-leaf traversals by taking advantage of the proximity of keys in sequential or near sequential index accesses.

DISCLOSURE OF INVENTION

In a preferred embodiment of the present invention, the proximity of keys in sequential or near sequential index probes is utilized by saving page information from previous index accesses. In particular, page information comprising the page number, high key value, low key value and log sequence number for three pages (LAST, PARENT and NEXT) are stored in separate information fields within an Index Lookaside Buffer (ILB). One ILB is maintained for each index. The LAST information field contains information on the most recent leaf page accessed during an index probe in a read key or an insert key operation, the PARENT information field contains information on the parent page of the most recently accessed leaf page described in the LAST information field, and the NEXT information field contains information on the most recent leaf page accessed during a fetch-next key or delete key operation.

On a subsequent index probe, the LAST, NEXT and PARENT information fields are sequentially analyzed to determine if the search key is contained within the leaf page described by the LAST or NEXT information fields or if the search key is contained within one of the leaf pages pointed to by the parent page described by the PARENT information field. If none of the LAST, NEXT or PARENT information fields identify the leaf page containing the search key then a default root-to-leaf traversal would commence.

The ordering of ILB analysis (LAST, NEXT then PARENT) is designed to minimize the amount of tree traversal required. If the search key is contained within one of the leaf pages described by the LAST or NEXT information fields, then no traversal is required. If the search key is contained within one of the leaf pages pointed to by the parent page described by the PARENT information field then a partial tree traversal commences (i.e., parent-to-leaf traversal). A complete tree traversal (i.e., root-to-leaf) occurs only if the search key is not contained on one of the leaf pages described by the LAST and NEXT information fields or the leaf pages pointed to by the page described by the PARENT information field.

In a second embodiment, the ILB further comprises multiple PARENT information fields. These multiple PARENT information fields store page information describing parent nodes that are multiple levels (i.e., two, three, four, etc.) above the leaf page described in the LAST information field. When applied to a large multi-level tree structured index, the additional PARENT information fields increase the likelihood that a complete root-leaf traversal will be avoided.

In a third embodiment, ILB consists solely of a LAST information field and a PARENT information field. Although the information on the most recent leaf page accessed during a fetch-next key or delete key operation is not available in this embodiment, the LAST and PARENT information fields eliminate root-to-leaf traversals in sequential or near sequential fetch or insert operations.

The foregoing and other features and advantages of the invention will be apparent from the following more particular description of preferred embodiments of the invention, as illustrated in the accompanying drawings.

BRIEF DESCRIPTION THE DRAWINGS

The preferred embodiment of the invention is now described with reference to the figures where like reference numbers indicate like elements. Also in the figures, the left most digits of each reference number corresponds to the figure in which the reference number is first used.

BEST MODE FOR CARRYING OUT THE INVENTION

1. Environment of the Invention

Figure 6:
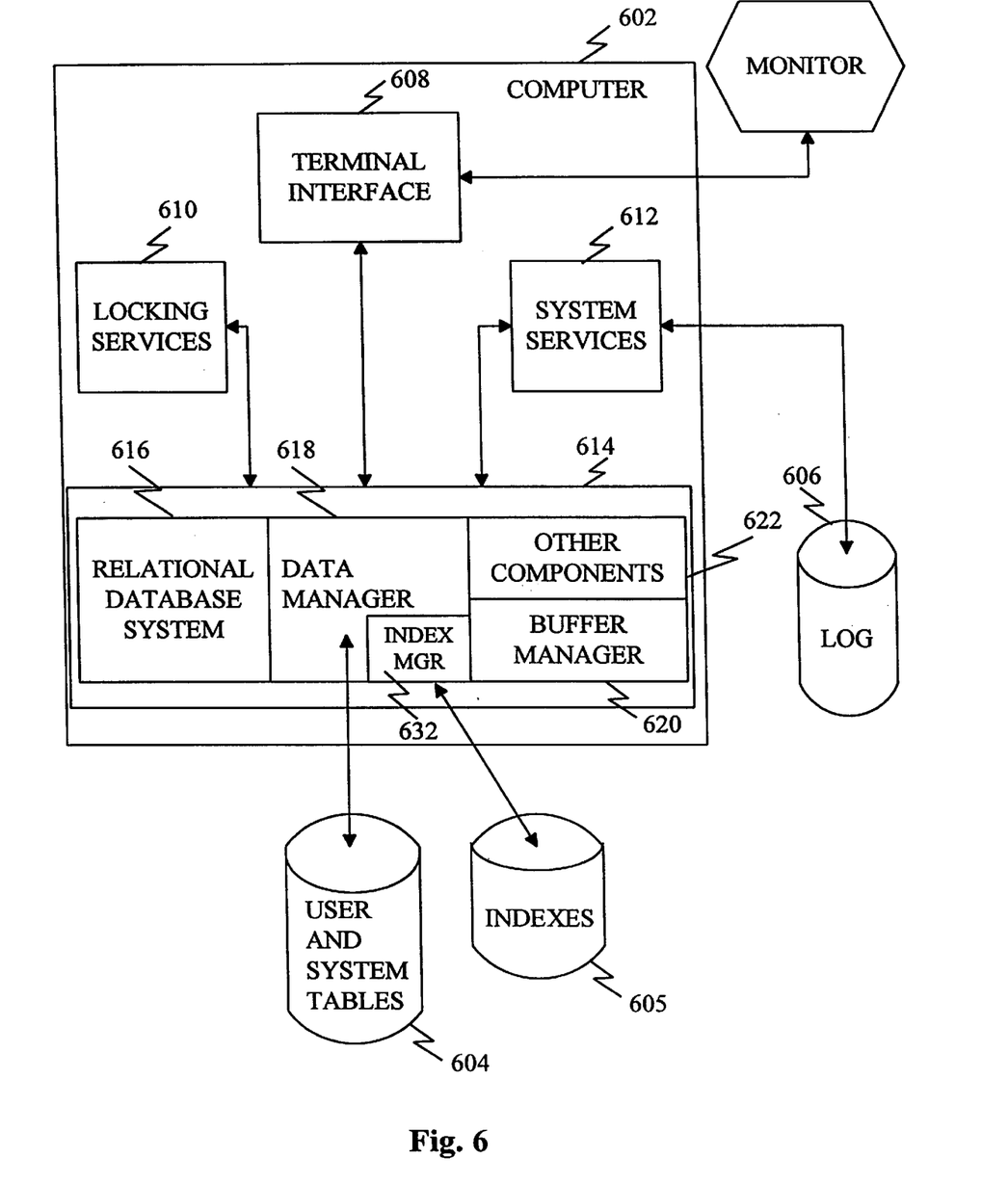
FIG. 6 is an an exemplary computer hardware environment in which the present invention can be implemented.

FIG. 6 illustrates an exemplary computer hardware environment in which the present invention can be implemented. In this exemplary environment, a computer system 602 is comprised of one or more processors connected to one or more electronic storage devices 604, 605, and 606, such as disk drives, on which one or more databases are stored.

Operators of the computer system 602 use a standard terminal interface 608, such as IMS/DB/DC, CICS, TSO, or other interface, to perform various search and retrieval functions, termed queries, against the databases. These functions are typically performed using Relational DataBase Management System (RDBMS) software that incorporates the Structured Query Language (SQL) standard. In one embodiment of the present invention, the RDBMS software comprises the DB2 product offered by IBM for the MVS. As will become apparent to those skilled in the relevant art, the present invention has application to any DBMS that uses SQL or any other data manipulation language and is not confined to any computer system environment.

The DB2 architecture includes three major components: (1) the IMS Resource Lock Manager (IRLM) 610, the systems services module 612, and the database services module 614. The IRLM 610 handles locking services for concurrency control. These locking services are provided because DB2 treats data as a shared resource, thereby allowing any number of users to access the same data simultaneously. Therefore, concurrency control is required to isolate users and to maintain data integrity.

Systems services module 612 controls the overall DB2 execution environment, including managing log data sets 606, gathering statistics, handling startup and shutdown, and providing management support.

At the center of the DB2 architecture is database services module 614. Database services module 614 contains several submodules, including Relational Database System (RDS) 616, data manager 618, buffer manager 620 and other components 622 such as an SQL compiler/interpreter. Data manager 618 further includes an index manager 632 that contains a set of procedures operative on indexes 605 stored in the database.

These modules support the functions of the SQL language, i.e., definition, access control, retrieval, and update of user and system data. The operation of these modules are well known to those skilled in the relevant art, and for the sake of brevity will not be described in detail herein.

2. Description of the Invention

To locate a key contained within an index tree, the value of that key, or search key, is used to guide the traversal through the index tree. This traversal during an index probe provides an efficient method of searching and accessing information contained within a database. Typically, the process of traversing the index tree requires comparisons of the search key with the key values within various nodes on successive levels. The present invention operates on the premise that it is advantageous to be able to eliminate redundant traversals through the index tree, since each index probe incurs substantial CPU costs through multiple key comparisons.

Figure 2:
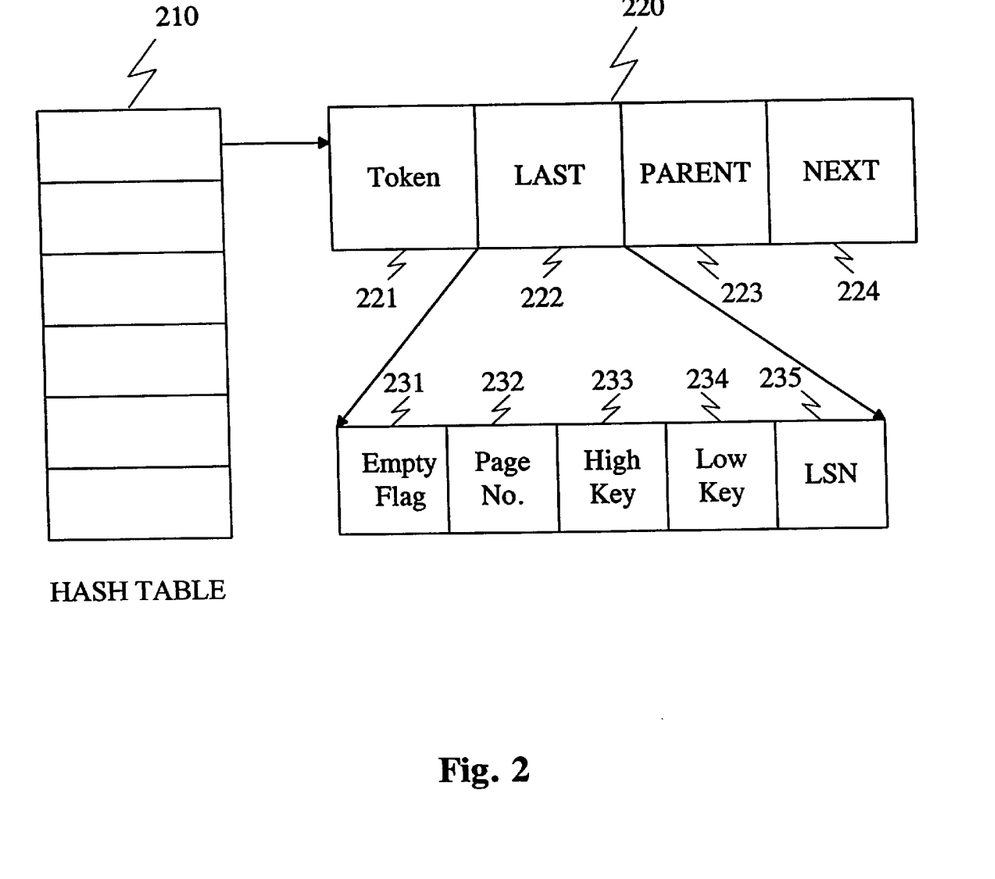
FIG. 2 is an embodiment of an Index Lookaside Buffer.

Accordingly, the present invention provides a system and method of eliminating redundant root-to-leaf traversals by retaining information about index pages accessed during previous index traversals. In a preferred embodiment, page information from prior index accesses is stored in an Index Lookaside Buffer (ILB). FIG. 2 illustrates an ILB implemented in accordance with a preferred embodiment of the present invention. ILB 220 is cached within index manager work area 632 and pointed to by a hash table 210 stored in relational database system 616. Only one ILB is provided per index. ILB 220 comprises: a Token field 221 that contains a unique number identifying the index, a LAST field 222 that contains information on the most recent leaf page accessed during an index probe relating to a read key or an insert key operation, a PARENT field 223 that contains information on the parent page of the most recently accessed leaf page described in the LAST field 222, and a NEXT field 224 that contains information on the most recent leaf page accessed during a fetch-next key or delete key operation.

Each of the LAST, PARENT and NEXT information fields 222–224 further includes an Empty Flag information field 231, a Page Number information field 232, a High Key information field 233, a Low Key information field 234 and a Log Sequence Number (LSN) information field 235. The LSN value associated with a page represents a unique Log entry identifier of any action that modifies a key value on that page. Whenever a page changes the LSN associated with that page also changes. The Log is maintained by data manager 618 and stored in storage device 606.

While Page Number, High Key, Low Key and LSN information fields 232–235 are specific values attributable to the leaf page or parent page being described, Empty Flag field 231 serves as an identifier indicating whether any valid information exists within information fields 232–235. The following description of the invention will clarify the function of information fields 221–224 within ILB 220.

For each database application, the index manager work area in database manager 618 is initialized to point to an empty hash table 210. When an index is first accessed due to a database call in the application, a pointer to ILB 220 is added to hash table 210. All further accesses to that index in subsequent database calls may avoid root-to-leaf traversals if ILB 220 for that index contains page information that indicates that the search key is within one of the pages described in the LAST, PARENT or NEXT information fields 222–224. This situation commonly arises when the search keys in sequential or near sequential index probes are in close proximity.

Prior to initiating the process of checking the potential proximity of a search key relative to prior index accesses, a lookaside flag (not shown) is first examined. In database manager 618, the lookaside flag is passed to the index manager 632 read key, add key and delete key operations. The lookaside flag is activated during (1) a fetch/select operation, (2) an insert operation, if the index to which the key is being added is the primary/clustering index (i.e., index that provides the most efficient access to the rows in the table), and (3) an update/delete operation if the index from which the key is being deleted or being added to is the same index which was used to position the index cursor (i.e., a construct used to scan and process a set of data one at a time). These three conditions identify potential situations where ILB 220 may prove advantageous in avoiding a complete root-to-leaf traversal. Thus, if the lookaside flag is activated, ILB 220 is analyzed, whereas if the lookaside flag is not activated, a root-to-leaf traversal is performed (default).

Specifically, whenever a read key, add key or delete key operation is invoked by an application, the lookaside flag is checked. If the lookaside flag is activated, then the hash table 210 is accessed using the table and index identifiers to locate the appropriate ILB 220. The accessed ILB 220 is then stored in a control block within index manager 632 for analysis. In addition, a refresh flag (not shown) is activated and serves to initiate the process of updating ILB 220. The process of updating will be described in detail below. If ILB 220 does not exist for the table and index identifiers, then an empty ILB 220 is created and added to the hash table 210 and the lookaside flag is deactivated.

Figure 3:
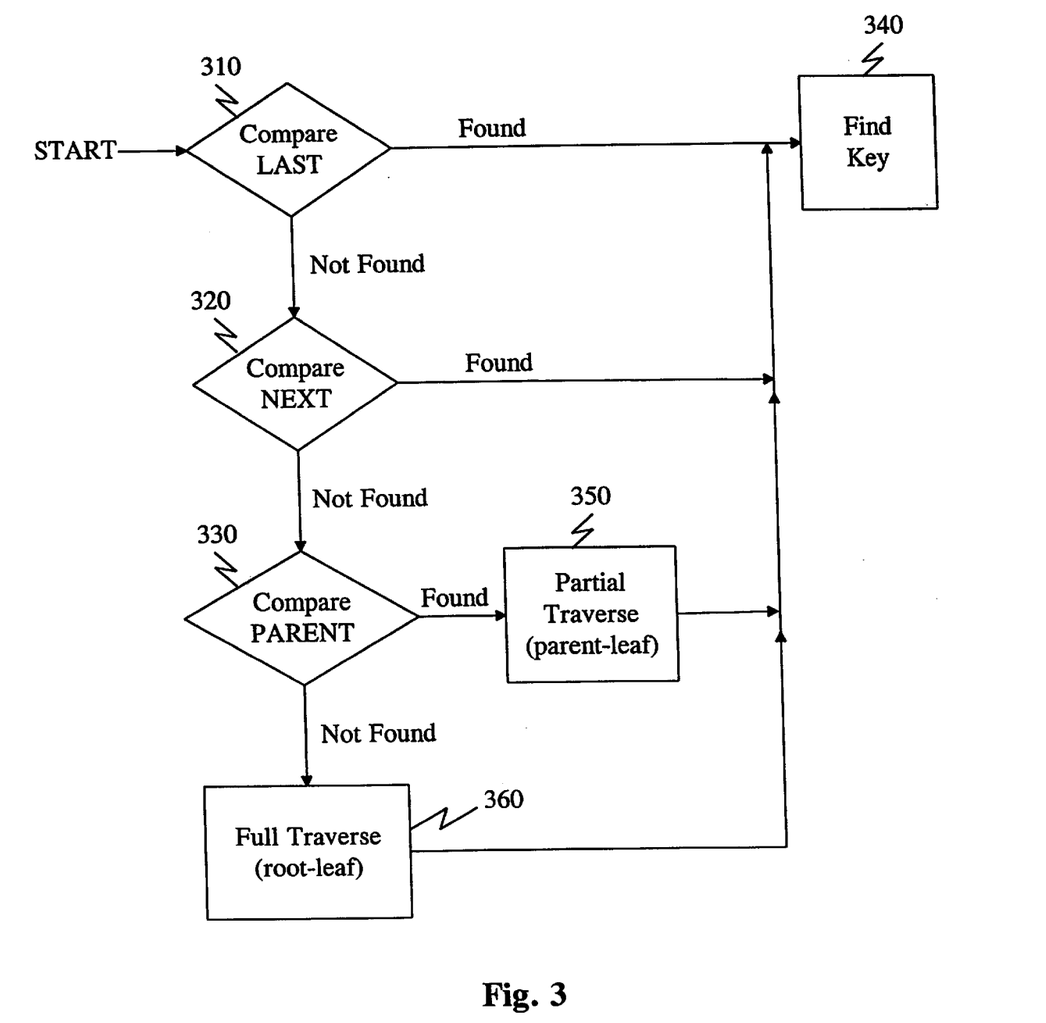
FIG. 3 is a flow diagram depicting the sequential processing of information fields within the Index Lookaside Buffer.

The processing of ILB 220 is illustrated in FIG. 3 and includes three compare steps 310, 320 and 330 that are performed sequentially. Each compare step 310–330 identifies whether the search key is contained within the page described by the LAST, NEXT or PARENT information fields 222–224, respectively. The sequential processing (LAST 222, NEXT 224 then PARENT 223) is terminated as soon as the page containing the search key is identified. If that page is identified as the leaf page described in the LAST 222 or NEXT 224 information fields, the Find Key step 340 initiates a search through that leaf page to find the search key and then fetches, inserts.or deletes that key. In this instance, the root-to-leaf traversal for this probe is eliminated entirely since ILB 220 identifies the leaf page directly.

On the other hand, if the search key is found within the parent page described in the PARENT information field 224, partial traverse step 350 must follow. Partial traverse step 350 initiates a partial tree traversal from that parent page to the appropriate leaf page. Consequently, the CPU and I/O costs associated with the root-to-parent traversal are thereby eliminated. Find key step 340 is initiated after the partial traverse step 350 (i.e., parent-to-leaf traversal) is complete.

If the search key is not contained within any of the pages (leaf or parent) described in the LAST, NEXT or PARENT information fields 222–224, a full traverse step 360 is performed. A full traverse is a default condition and involves traversing the tree from root to leaf to identify the appropriate leaf page in order to find the desired index key.

The present invention thus functions as a potential bypass of the conventional method of complete index tree traversals. In sum, no tree traversals are required when the search key is contained within the leaf page described in either the LAST 222 or NEXT 224 information fields, parent-to-leaf traversal is required when the search key is contained within the parent page described in the PARENT information field 223, and the default root-to-leaf traversal results only if neither the LAST, NEXT nor PARENT information fields 222–224 identify the page containing the search key.

As an exception to the method described above, if an add key or delete key operation is invoked by an application, an additional step may need to be performed. For an add key operation, if the proper leaf page is found through analyzing ILB 220 and the leaf page requires splitting, then the lookaside flag is deactivated and the search is restarted from the root. For a delete key operation, if the proper leaf page is found through analyzing ILB 220 and the leaf page requires deletion, then the lookaside flag is turned off and the search is restarted from the root. For these scenarios, root-leaf traversal is required because leaf page splitting and leaf page deletion potentially change the low key and high key values on the parent page.

Figure 4:
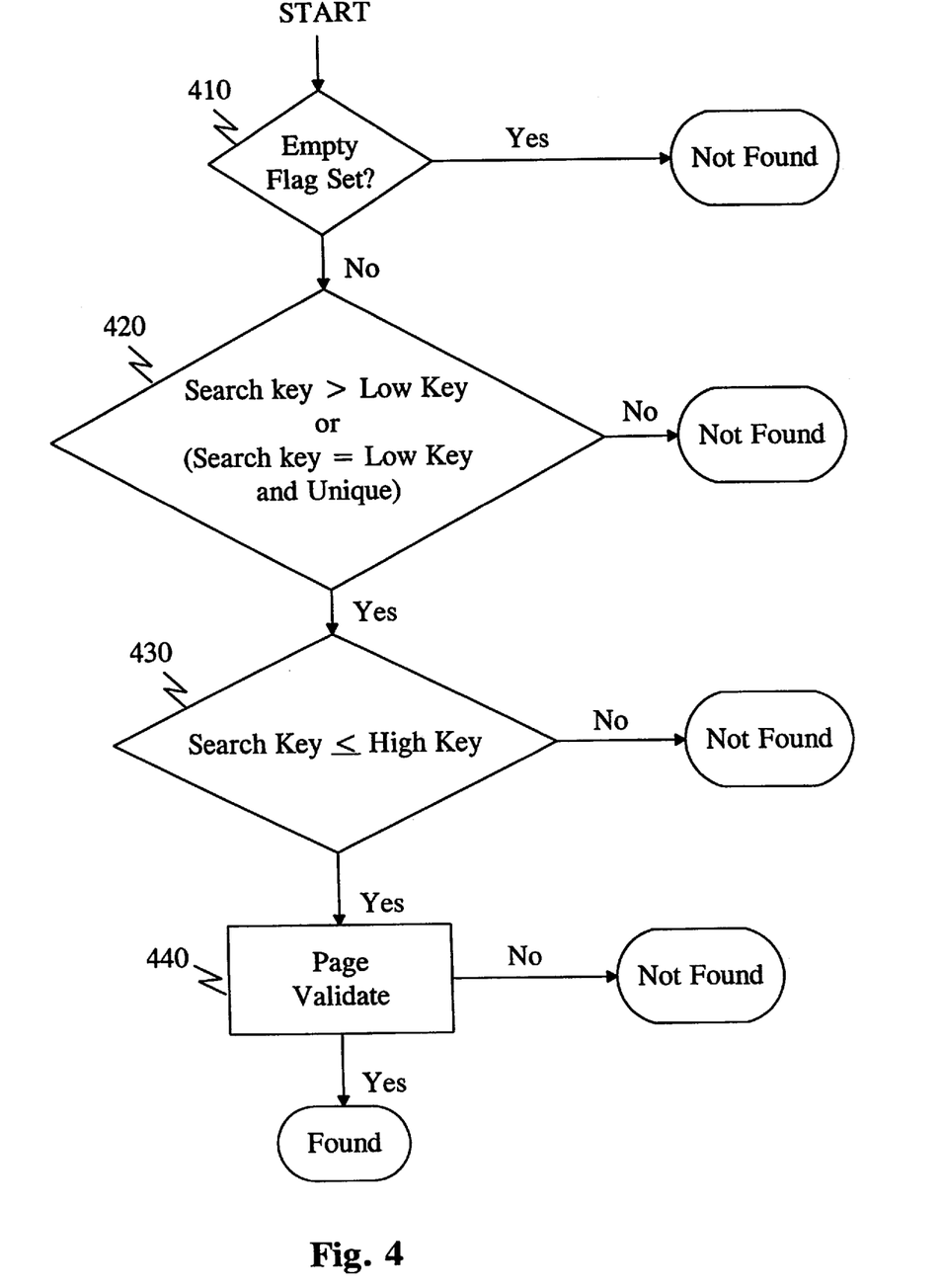
FIG. 4 is a flow diagram depicting a search key comparison process.

Referring to FIG. 4, there is shown the steps performed by compare steps 310, 320 and 330. The comparison process consists primarily of identifying whether the search key is within the boundaries defined by the high key 233 and low key 234 values of the LAST, NEXT or PARENT information fields 222–224. To start, step 410 checks the status of empty flag information field 231 to determine if any valid information is available to be processed. Step 420 then compares the search key value to the low key value to determine if (1) search key> low key or (2) search key= low key AND index is unique. The uniqueness criteria ensures that if the search key is equal to the low key value, the search key is not on the preceding leaf page. Step 430 follows by determining whether the search key<= high key. If any one of the conditions within steps 410, 420 and 430 are not satisfied the comparison process is promptly discontinued and compare steps 310, 320 or 330 would indicate that the search key did not exist within that page. If all conditions are satisfied, the search key exists on that page as defined by the LAST, NEXT or PARENT information fields 222–224. However, since the page described by one of the LAST, NEXT or PARENT information fields 222–224 may have been modified by another application since the last update of that field, the page must be validated in step 440 to determine if the search key is contained within the actual page.

Figure 5:
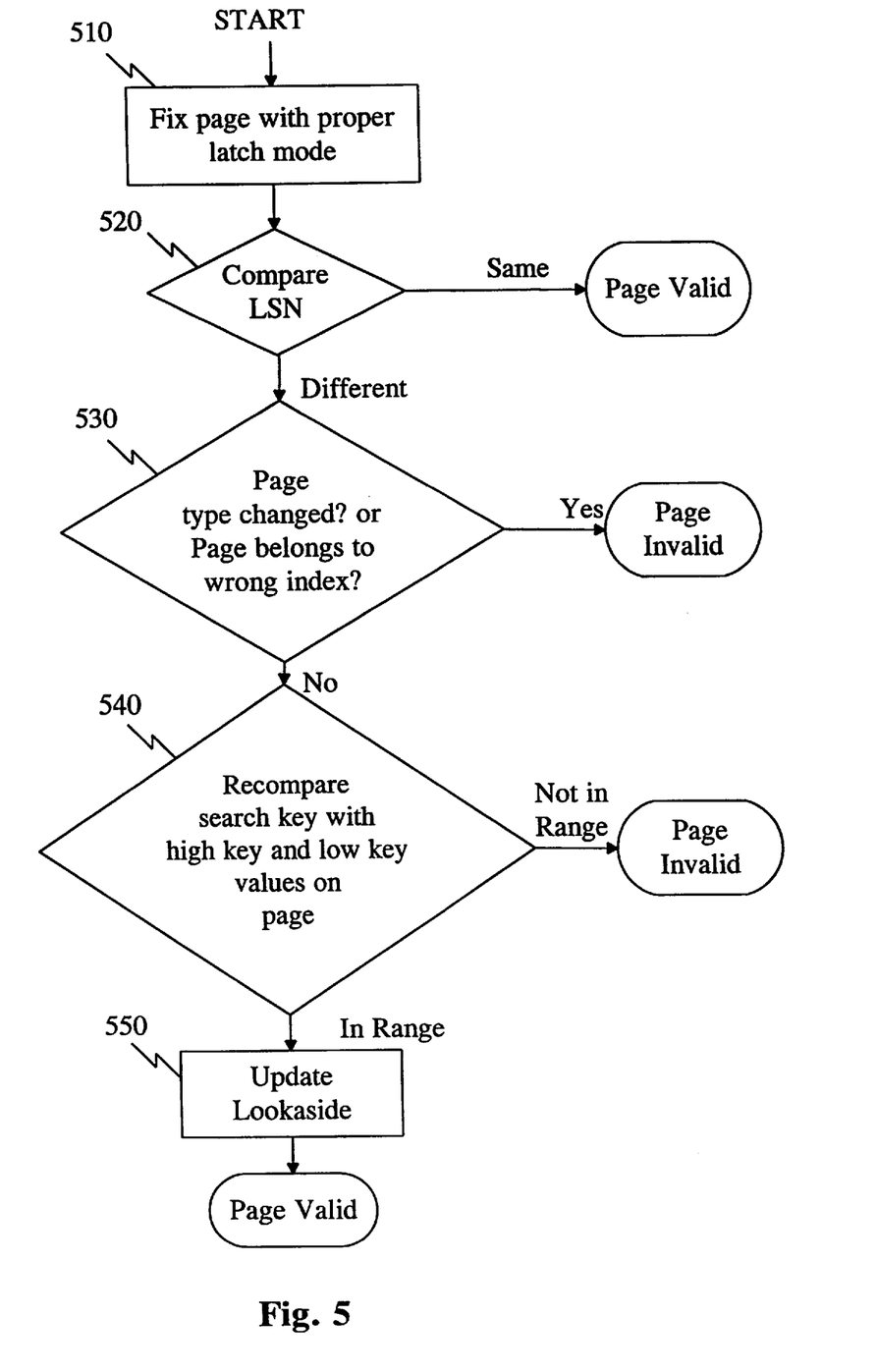
FIG. 5 is a flow diagram depicting a page validation process.

FIG. 5, shows validation process 440 in greater detail. First in step 510, the index page is fixed with the proper latch mode. If an add/delete operation has been invoked, the page is fixed with an exclusive latch (X-latch) to prevent any concurrent changes from occurring during the validation process. If a fetch operation has been invoked, the page is fixed with a shared latch (S-latch) that allows multiple users to have read only access to that page. Next, in step 520, the LSN on the page is compared with the LSN 235 in the LAST, NEXT or PARENT information fields 222–224. Since the LSN 235 value is changed any time the page has been modified, the LSN comparison provides a quick check to determine if the page has been altered in any way.

If the LSNs are different, step 530 determines whether the page type has changed (e.g., leaf page to non-leaf page) or whether the page belongs to the wrong index (determined through an index identifier on the page). In either case, the page is unlatched, the validation process 440 returns an invalid result, and one of the compare steps 310, 320 or 330 indicates that the search key was not found within the page.

If neither of the conditions within step 530 are satisfied, then the only changes within the page are modifications to records within the page. Instead of submitting to a full root-to-leaf traversal, step 540 determines whether, despite the page modifications, the search key still resides within that page. A recomparison is then initiated wherein the search key is compared to the high key and low key values on the page itself. If the search key is not within that range, the page is unlatched, the validation process 440 returns an invalid result, and one of the compare steps 310, 320 or 330 indicates that the search key was not found within the page. However, if the search key is within that range, step 550 updates ILB 220 with new high key 233, low key 234 and LSN 235 values, the validation process 440 returns a valid result, and one of the compare steps 310, 320 or 330 indicates that the search key was found within the page.

Generally, the preceding description identifies the steps required for analyzing the information within ILB 220 to determine if a complete root-to-leaf traversal is required. Promoting the efficiency of this process requires the steps of updating the LAST, NEXT and PARENT information fields 222–224 once an index probe has been completed. Except for the updating process in step 550, the information in ILB 220 is refreshed in the find key step 340 when the refresh flag is activated.

During an insert, the LAST 222 and PARENT 223 information fields of ILB 220 are updated. Although the LSN 235 for the LAST information field 222 is always updated since the page LSN changes on an insert key operation, the high key and low key values in the LAST information field 222 is updated only when the inserted key is the first or last key on the page.

During the first fetch after a cursor is opened, all information fields 222–224 of ILB 220 are updated with the LAST 222 and NEXT 224 information fields updated to the same values. During subsequent probes, only the LAST 222 and PARENT 223 information fields are updated. On a fetch-next-key operation, only the NEXT information field 224 of ILB 220 is updated.

During a delete, only the NEXT information field 224 is updated. Although the LSN 235 for the NEXT information field 224 is always updated since the page LSN changes on a delete key operation, the high key and low key values in the NEXT information field 224 are updated only when the deleted key is the first or last key on the page.

Figure 7:
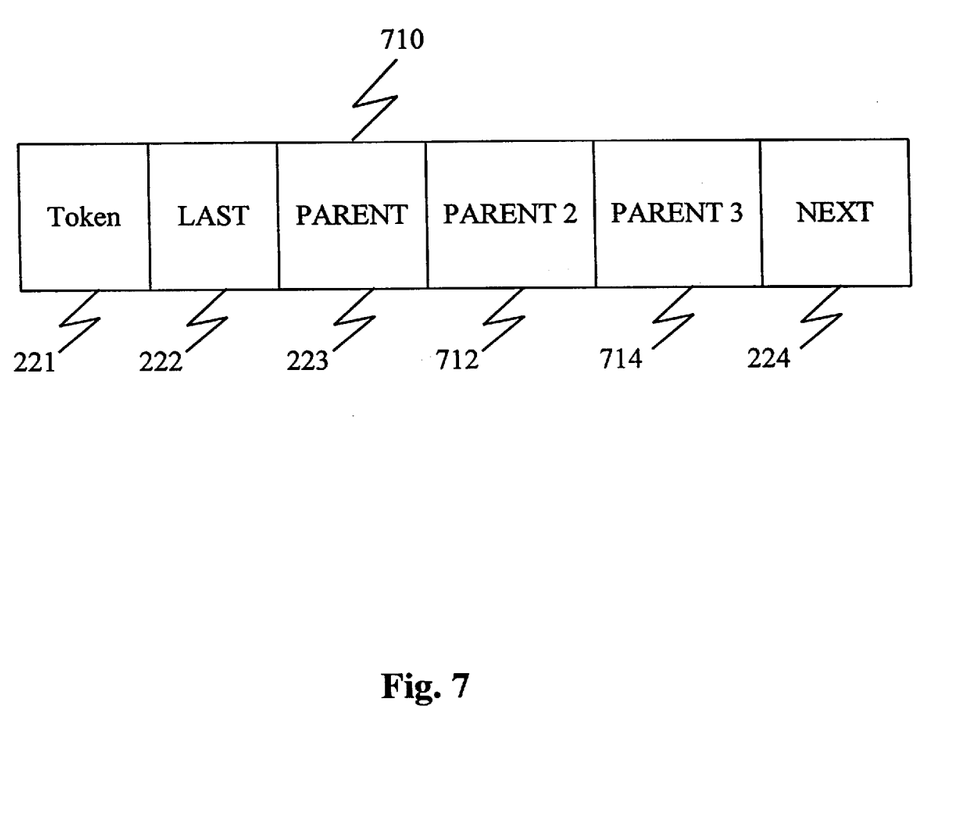
FIG. 7 is a second embodiment of an Index Lookaside Buffer.

In a second embodiment illustrated in FIG. 7, ILB 710 comprises multiple PARENT information fields 223, 712, 714. These multiple PARENT information fields 223, 712, 714 store page information (identical to page information fields 231–235 in FIG. 2) describing parent nodes that are multiple levels (i.e., two, three, four, etc.) above the leaf page described in LAST information field 222. As shown, the page information in PARENT information field 223 describes the parent node of the leaf page described in LAST information field 222. Similarly, PARENT2 information field 712 describes the parent node of the page described in PARENT information field 223, and PARENT3 information field 714 describes the parent node of the page described in PARENT2 information field 712. Clearly, the only limit to the number of PARENT information fields depends on the number of levels in a tree structured.index.

Concerning the order of ILB 710 analysis, PARENT2 and PARENT3 information fields 712, 714 follow the analysis of PARENT information field 223. In relation to the ILB analysis of FIG. 3, the analysis of PARENT2 and PARENT3 information fields 712, 714 occurs between steps 330 and 360. The inclusion of additional PARENT information fields 712, 714 in ILB 710 increase the likelihood that a complete root-leaf traversal will be avoided.

Figure 8:
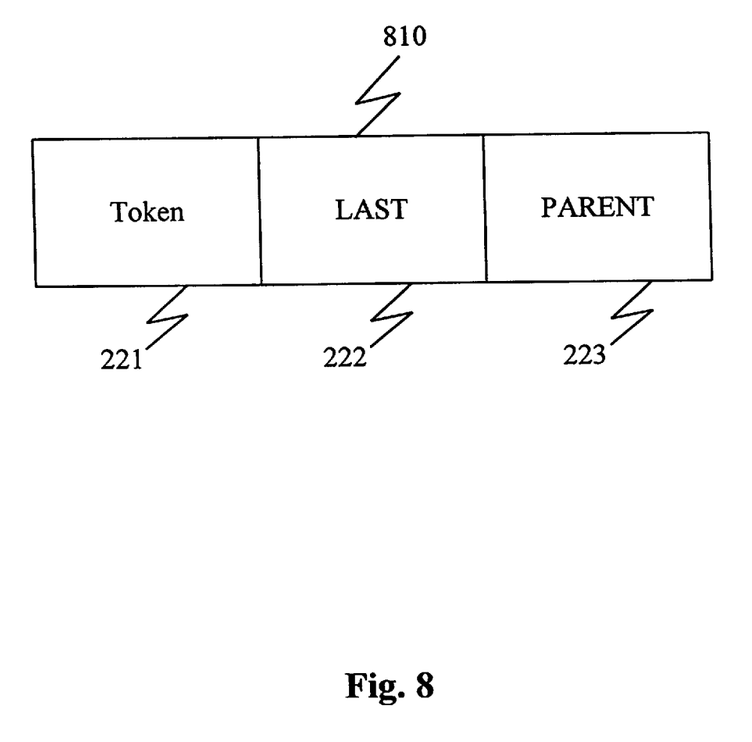
FIG. 8 is a third embodiment of an Index Lookaside Buffer.

In a third embodiment illustrated in FIG. 8, ILB 810 consists solely of a LAST information field 222 and a PARENT information field 223. Although the information on the most recent leaf page accessed during a fetch-next key or delete key operation is not available, the LAST and PARENT information fields 222, 223 would still eliminate root-to-leaf traversals in sequential or near sequential read or insert operations.

In an alternative embodiment, the present invention is a computer program product (such as a floppy disk, compact disk, etc.) comprising a computer usable/readable media having control logic recorded thereon. The control logic, when loaded into memory and executed by a CPU, enables the CPU to perform the operations described herein. Accordingly, such control logic represents a controller, since it controls the CPU during execution.

While the invention has been particularly shown and described with reference to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. A program storage device readable by a machine tangibly embodying a program of instructions executable by the machine to perform method steps for avoiding a root-to-leaf traversal of an index tree having leaf and parent pages, said method steps comprising:

a. storing page descriptive information in a LAST information field and a PARENT information field of an index lookaside buffer, said LAST information field identifying the most recent leaf page accessed during an index probe and said PARENT information field identifying a parent node of the most recent leaf page accessed during an index probe;

b. determining if a search key is located within the leaf page described by said LAST information field; and c. determining if said search key is located within one of the leaf pages pointed to by the parent page described in said PARENT information field.

2. The program storage device of claim 1, wherein said LAST and PARENT information fields comprise a page number information field, a high key information field and a low key information field.

3. The program storage device of claim 2, wherein the steps of determining comprise the step of comparing said search key to the values in said low key information field and said high key information field.

4. The program storage device of claim 1, further including instructions executable by the machine to perform the step of performing a root-to-leaf traversal of the index tree to find the leaf page containing said search key if said LAST and PARENT information fields do not identify the leaf page containing the search key.

5. The program storage device of claim 4, further including instructions executable by the machine to perform the step of performing a parent-to-leaf traversal when it is determined that said search key is within one of the leaf pages pointed to by the parent page described by said PARENT information field.

6. A program storage device readable by a machine tangibly embodying a program of instructions executable by the machine to perform method steps for avoiding a root-to-leaf traversal of an index tree having leaf and parent pages, said method steps comprising:

a. storing page information in a LAST information field, a PARENT information field and a NEXT information field of an index lookaside buffer, said LAST information field identifying the most recent leaf page accessed during an index probe in a read-key or an insert-key operation, said PARENT information field identifying the parent page of the leaf page described in said LAST information field and said NEXT information field identifying the most recent leaf page accessed during an index probe in a fetch-next-key or delete-key operation;

b. determining if a search key is located within the leaf page described by said LAST information field;

c. determining if said search key is located within the leaf page described by said NEXT information field; and d. determining if said search key is located within one of the leaf pages pointed to by the parent page described in said PARENT information field.

7. The program storage device of claim 6, wherein said LAST, NEXT and PARENT information fields comprise a page number, high key, low key and log sequence number (LSN) information fields.

8. The program storage device of claim 7, wherein the steps of determining comprises the steps of:

(1) comparing said search key to the values in said low key and high key information fields, and (2) validating the page to determine if the page has been modified.

9. The program storage device of claim 8, wherein the step of validating the page comprises the steps of:

(1) comparing the LSN on the page to the LSN value in the information field, and (2) comparing the search key with the high key and low key values on the page if the LSNs do not match.

10. The program storage device of claim 6, further including instructions executable by the machine to perform the step of performing a parent-to-leaf traversal when it is determined that said search key is within one of the leaf pages pointed to by the parent page described by said PARENT information field.

11. The program storage device of claim 10, further including instructions executable by the machine to perform the step of performing a root-to-leaf traversal of the index tree to find the leaf page containing said search key if said LAST, NEXT or PARENT information fields are unable to locate the leaf page containing said search key.

12. The program storage device of claim 6, wherein said step of storing further includes the step of storing page information in additional PARENT information fields of said index lookaside buffer, said additional PARENT information fields containing page information of parent nodes multiple levels above the most recent leaf page accessed during an index probe.

13. A computer program product for use with a computer system, comprising:

a computer usable medium having computer readable program code means embodied in said medium for causing the computer system to avoid root-to-leaf traversal of an index tree having leaf and parent pages, said computer readable program code means including, first computer readable program code means for causing said computer system to effect a storage of page descriptive information in a LAST information field and a PARENT information field of an index lookaside buffer, said LAST information field identifying the most recent leaf page accessed during an index probe and said PARENT information field identifying the parent page of the most recent leaf page accessed during an index probe; and second computer readable program code means for causing said computer system to effect a determination of whether a search key is located within one of the leaf pages described by said page descriptive information within said LAST information field or within one of the leaf pages pointed to by the parent page described by said PARENT information field.

14. The computer program product of claim 13, further comprising computer readable program code means for causing said computer system to effect a parent-to-leaf traversal if it is determined that said search key is within one of the leaf pages pointed to by the parent page described by said PARENT information field.

15. The computer program product of claim 14, further comprising computer readable program code means for causing said computer system to effect a root-to-leaf traversal if said LAST and PARENT information fields do not identify the leaf page containing said search key.

16. The computer program product of claim 13, wherein said LAST and PARENT information fields comprise a page number information field, a high key information field and a low key information field.

17. The computer program product of claim 16, wherein said second computer readable program code means comprises computer readable program code means for causing said computer system to effect a comparison of said search key to the values in said low key information field and said high key information field.

18. A computer program product for use with a computer system, comprising:

a computer usable medium having computer readable program code means embodied in said medium for causing the computer system to avoid root-to-leaf traversal of an index tree having leaf and parent pages, said computer readable program code means including, first computer readable program code means for causing said computer system to store page descriptive information in a LAST information field, a PARENT information field and a NEXT information field of an index lookaside buffer, said LAST information field identifying the most recent leaf page accessed during an index probe in a read-key or an insert-key operation, said PARENT information field identifying the parent page of the leaf page described in said LAST information field and said NEXT information field identifying the most recent leaf page accessed during an index probe in a fetch-next-key or delete-key operation; and second computer readable program code means for causing said computer system to determine whether a search key is located within one of the leaf pages described by said LAST information field and said NEXT information field or is located within one of the leaf pages pointed to by the parent page described in said PARENT information field.

19. The computer program product of claim 18, further comprising computer readable program code means for causing said computer system to effect a parent-to-leaf traversal if it is determined that said search key is within one of the leaf pages pointed to by the parent page described by said PARENT information field.

20. The computer program product of claim 19, further comprising computer readable program code means for causing said computer system to effect a root-to-leaf traversal if said LAST, NEXT and PARENT information fields do not identify the leaf page containing said search key.

21. The computer program product of claim 20, further comprising computer readable program code means for causing said computer system to store further page information in additional PARENT information fields, said additional PARENT information fields containing page information of parent pages multiple levels above the most recent leaf page accessed during an index probe.

22. The computer program product of claim 18, wherein said LAST, NEXT and PARENT information fields comprise a page number, high key, low key and log sequence number (LSN) information fields.

23. The computer program product of claim 22, wherein said second computer readable program code means comprises:

third computer readable program code means for causing said computer system to effect a comparison of said search key to the values in said low key information field and said high key information field; and fourth computer readable program code means for causing said computer system to effect a validation of the page to determine if the page has been modified.

24. The computer program product of claim 23, wherein said fourth computer readable program code means comprises:

computer readable program code means for causing said computer system to effect a comparison of the LSN on the page to the LSN value in the information field; and computer readable program code means for causing said computer system to effect a comparison of the search key with the high key and low key values on the page if the LSN do not match.

* * * * *